United States Patent

Couderchon et al.

[11] Patent Number: 5,838,080
[45] Date of Patent: Nov. 17, 1998

[54] STEPPER MOTOR FOR CLOCKWORK IN WHICH THE STATOR CONSISTS OF A SOFT MAGNETIC ALLOY AND SOFT MAGNETIC ALLOY

[75] Inventors: Georges Couderchon; Laurent Chaput; Lucien Coutu, all of Sauvigny lés Bois; Dominique Gautard, Varennes Vauzelles, all of France

[73] Assignee: Imphy S.A., Puteaux, France

[21] Appl. No.: 908,667

[22] Filed: Aug. 6, 1997

[30] Foreign Application Priority Data

Aug. 29, 1996 [FR] France ................................. 96 10554

[51] Int. Cl.[6] ............................. H02K 37/00; C22F 1/10
[52] U.S. Cl. ..................... 310/49 R; 310/44; 148/555; 148/675
[58] Field of Search ................. 310/49 A, 49 R, 310/44; 148/555, 556, 675, 676, 677

[56] References Cited

U.S. PATENT DOCUMENTS 4,323,186  4/1982  Hunt ........................ 29/423 X
5,169,463  12/1992  Doherty et al. ............... 148/556 X
5,593,519  1/1997  Blankenship, Jr. et al. ........ 148/556 X

FOREIGN PATENT DOCUMENTS 0 343 292 A   9/1989   European Pat. Off. .
0 505 595 A   9/1992   European Pat. Off. .
0 640 895 A   3/1995   European Pat. Off. .
0 675 216 A  10/1995   European Pat. Off. .

*Primary Examiner*—Steven L. Stephan
*Assistant Examiner*—Judson H. Jones
*Attorney, Agent, or Firm*—Oblon, Spivak, McClelland, Maier & Neustadt, P.C.

[57] ABSTRACT

Stepper motor of the type comprising a rotor (1), a stator (2) and a coil (3) consisting of a magnetic core (4) and of a winding (5), in which the stator (2) consists of a soft magnetic alloy of the FeNiCr type, the chemical composition of which includes, by weight: $40\% \leq Ni+Co \leq 60\%$, $0\% \leq Co \leq 7\%$, $8\% \leq Cr \leq 13.5\%$, $8\% \leq Cr+Mn+Si+Mo+Nb+V+W \leq 13.5\%$, the remainder being iron and impurities resulting from the manufacture. Soft magnetic alloy.

13 Claims, 1 Drawing Sheet

STEPPER MOTOR FOR CLOCKWORK IN WHICH THE STATOR CONSISTS OF A SOFT MAGNETIC ALLOY AND SOFT MAGNETIC ALLOY

FIELD OF THE INVENTION

The invention relates to a stepper motor usable especially in clockwork, of the type comprising a rotor, a stator and a coil provided with a magnetic core, and to soft magnetic alloys of the FeNiCr type, usable for the manufacture of these motors.

PRIOR ART

The movement of the hands of analog quartz watches is ensured by a miniature stepper electric motor, generally of the Lavet type. Such a motor comprises a rotor consisting of a permanent magnet, a stator with two poles and a coil provided with a magnetic core. The stator may be either made up of two parts, or a single block. In the latter case it is said to be "with magnetically saturable isthmuses". The parts making up the stator and the core are cut out of cold-rolled strips of soft magnetic alloys of the FeNi type whose magnetic properties are suitable for the function. The thickness of the strips is of the order of 0.4 to 0.8 mm. The core is generally made of alloy of the Ni48Fe class and the stator, when it is with magnetically saturable isthmuses, is in most cases an alloy of the Ni80Mo5Fe class. These alloys have the disadvantage of being expensive and it is desirable to be able to have access to less expensive alloys. This problem is proportionately more important since quartz watches have become a very large-scale consumption product.

To solve this problem it has been proposed to employ an alloy of the Ni35Mo5Fe class. However, this alloy has the disadvantage of having magnetic properties which are highly sensitive to the temperature between $-20°$ C. and $70°$ C., that is to say over the temperature range of utilization of watches.

Furthermore, watches are increasingly frequently either assembled or employed in parts of the world where climate conditions are very favorable to deterioration of the components by oxidation. Anticorrosion treatments can undoubtedly be performed, but these treatments are expensive and it is desirable to be able to avoid them. This problem arises particularly with alloys of the Ni35Mo5Fe type, which are more economical than the alloys of the Ni80Mo5Fe type, but also more sensitive to moist atmospheric corrosion.

The aim of the present invention is to remedy these disadvantages by proposing an alloy and a stepper motor which can be used especially in clockwork, which is at the same time economical, not very oxidizable and not very sensitive to temperature variations.

SUMMARY OF THE INVENTION

To this end, the subject-matter of the invention is a stepper motor of the type comprising a rotor, a stator and a coil consisting of a magnetic core and of a winding, in which the stator, preferably with magnetically saturable isthmuses, consists of a soft magnetic alloy of the FeNiCr type, the chemical composition of which includes, by weight:

$$40\% \leq Ni + Co \leq 60\%$$
$$0\% \leq Co \leq 7\%$$
$$8\% \leq Cr \leq 13.5\%$$
$$8\% \leq Cr + Mn + Si + Mo + Nb + V + W \leq 13.5\%,$$

the remainder being iron and impurities resulting from the manufacture.

The soft magnetic alloy of the FeNiCr type of which the stator consists preferably has the following characteristics:

Curie temperature Tc>200° C.

saturation induction Bs of between 0.69 and 0.8 tesla at +25° C.

coercitive field Hc<0.07 oersteds (1 oersted=79.577 A/m)

electric resistivity $\rho > 80\ \mu\Omega$cm.

The chemical composition of the soft magnetic alloy of the FeNiCr type of which the stator consists is preferably such that:

$$53\% \leq Ni + Co \leq 57\%$$
$$0\% \leq Co \leq 7\%$$
$$9\% \leq Cr \leq 11\%$$
$$9\% \leq Cr + Mn + Si + Mo + Nb + V + W \leq 11\%,$$

the remainder being iron and impurities resulting from the manufacture.

The chemical composition of the soft magnetic alloy of the FeNiCr type of which the stator consists can also be such that:

$$48.5\% \leq Ni + Co \leq 51.5\%$$
$$0\% \leq Co \leq 7\%$$
$$8\% \leq Cr \leq 10\%$$
$$0\% \leq No \leq 1.5\%$$
$$8\% \leq Cr + Mn + Si + Mo + Nb + V + W \leq 12\%,$$

the remainder being iron and impurities resulting from the manufacture.

In addition, the core may be made of FeNiCr alloy, the chemical composition of which includes, by weight:

$$48.5\% \leq Ni + Co \leq 51.5\%$$
$$0\% \leq Co \leq 7\%$$
$$5\% \leq Cr \leq 8\%$$
$$5\% \leq Cr + Mn + Si + Mo + Nb + V + W \leq 10\%,$$

the remainder being iron and impurities resulting from the manufacture.

The invention also relates to a soft magnetic alloy of the FeNiCr type, the chemical composition of which includes, by weight:

$$53\% \leq Ni + Co \leq 57\%$$
$$0\% \leq Co \leq 7\%$$
$$9\% \leq Cr \leq 11\%$$
$$9\% \leq Cr + Mn + Si + Mo + Nb + V + W \leq 11\%,$$

the remainder being iron and impurities resulting from the manufacture.

This alloy preferably contains from 0.1% to 1% of manganese and from 0.05% to 0.3% of silicon. Also preferably it contains less than 0.005% of oxygen and less than 0.005% of sulfur.

The invention also relates to a soft magnetic alloy of the FeNiCr type, the chemical composition of which includes, by weight:

$$48.5\% \leq Ni + Co \leq 51.5\%$$
$$0\% \leq Co \leq 7\%$$
$$8\% \leq Cr \leq 10\%$$

-continued $$0\% \leq No \leq 1.5\%$$
$$8\% \leq Cr + Mn + Si + Mo + Nb + V + W \leq 12\%,$$

the remainder being iron and impurities resulting from the manufacture.

This alloy preferably contains from 0.1% to 1% of manganese and from 0.05% to 0.3% of silicon; also preferably it contains less than 0.005% of oxygen and less than 0.005% of sulfur.

BRIEF DESCRIPTION OF THE DRAWING

The invention will now be described more precisely, but without any limitation being implied, with regard to the single FIGURE which shows diagrammatically a stepper motor for clockwork.

DESCRIPTION OF THE PREFERRED EMBODIMENTS

Figure 1:
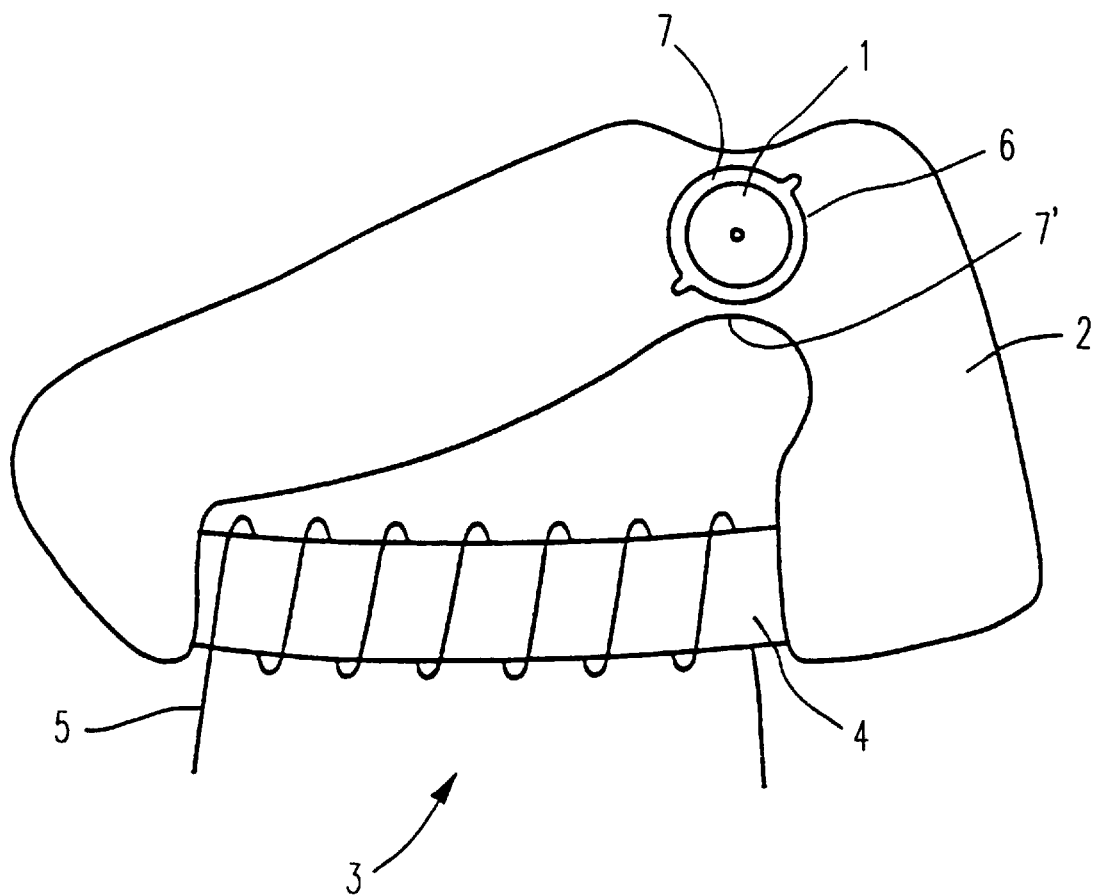

The motor of the Lavet type, with magnetically saturable isthmuses, shown in FIG. 1 comprises a rotor 1 consisting of a permanent magnet, for example made of samarium-cobalt, of a stator 2 and of a coil 3 consisting of a magnetic core 4 and of a winding 5. The stator 2 comprises a hollow 6 in which the rotor 1 is housed. On each side of the hollow 6 the stator 2 comprises two narrowings 7 and 7', called "isthmuses". The isthmuses are said to be "magnetically saturable" when their geometry and the nature of the material which constitutes the stator are such that when the motor is functioning, the magnetic induction which crosses them is close to the saturation induction of the material.

At rest, that is to say when no electric current passes through the coil winding, the position of the rotor is defined by the geometry of the stator and in particular of the hollow 6 in which the rotor is housed. This position is such that the reluctance resulting from the magnetic interaction of the rotor and of the magnetic circuit consisting of the stator 2 and the core 4 of the coil 3 is minimal. Every second an electric pulse is sent into the coil winding 5. This electric pulse generates a magnetic field which makes the motor turn half a turn. The electrical energy is supplied by a battery.

In order that the motor should function satisfactorily, the magnetic circuit consisting of the stator 2 and of the core 4 must be made up of materials whose magnetic permeability is high, the coercitive field low and the electric resistivity high, in order to minimize the electric consumption and thus to obtain a battery lifetime which is as long as possible. In order to maximize the power per unit mass and hence to minimize the size of the motor, the saturation induction of the materials must be high, although the saturation induction of the material of which the stator consists must not be too high, so as to facilitate the magnetic saturation of the isthmuses by the excitation pulses. Finally, these properties must remain as stable as possible over the whole operating temperature range of the motor; this range is usually from −20° C. to +70° C.

The stator 2 is made of soft magnetic alloy of the FeNiCr type which contains, by weight:

from 40% to 60% of nickel which can be partially substituted with cobalt in a content that can be up to 7%, the sum of nickel plus cobalt remaining between 40% and 60%; these elements are intended to impart the main magnetic characteristics and a sufficient Curie temperature;

from 8% to 13.5% of chromium, to obtain a good resistance to oxidation and more particularly to wet atmospheric corrosion;

manganese, preferably from 0.1% to 1%, in order to obtain good hot-rolling processability;

silicon, preferably from 0.05% to 0.3%, to ensure deoxidation during the manufacture;

optionally one or more elements taken from molybdenum, niobium, vanadium and tungsten, in contents such that the sum of these contents remains smaller than 3%; these elements improve the corrosion resistance and the hot mechanical strength, and this facilitates the operations of manufacture of the components of the stepper motors but, in too large a quantity, they lower excessively the saturation induction Bs;

the remainder being iron and impurities resulting from the manufacture.

In order to obtain a sufficient saturation induction Bs, the sum Cr+Mn+Si+Mo+Nb+V+W must remain smaller than 13.5% (because of the minimum chromium content, this sum is greater than 8%).

The impurities resulting from the manufacture are, especially, oxygen and sulfur, which have an unfavorable effect on the coercitive field. Also, the content of each of these impurities must be as low as possible and, preferably, lower than 50 ppm.

It is desirable that the chemical composition should be adjusted in order that the alloy should have the following characteristics:

Curie temperature Tc>200° C. and preferably Tc>250° C., to obtain good-stability of the magnetic characteristics between −20° C. and +70° C., saturation induction Bs of between 0.6 and 0.9 tesla at the ambient temperature and, preferably, of between 0.69 and 0.8 tesla at +25° C., coercitive field Hc<0.07 oersteds, electric resistivity $\rho > \mu \Omega$ cm.

This adjustment in the chemical composition can be made by a person skilled in the art, taking into account the fact that:

Bs decreases when the content of nonferromagnetic elements (elements other than Fe, Ni and Co) increases;

Hc increases when the content of impurities increases;

$\rho$ generally increases when the content of nonferromagnetic elements increases;

Tc decreases when the content of nonferromagnetic elements increases.

For example, and preferably, the composition of the alloy may be such that:

$$53\% \leq Ni + Co \leq 57\%$$
$$0\% \leq Co \leq 7\%$$
$$9\% \leq Cr \leq 11\%$$
$$9\% \leq Cr + Mn + Si + Mo + Nb + V + W \leq 11\%,$$

the remainder being iron and impurities resulting from the manufacture.

This chemical composition (of the Ni55Cr10Fe type) has the advantage of simultaneously having a suitable saturation induction (of the order of 0.7 tesla) and a high chromium content which imparts a good corrosion resistance.

It is also possible to employ an alloy whose composition is such that:

$$48.5\% \leq Ni + Co \leq 51.5\%$$
$$0\% \leq Co \leq 7\%$$
$$8\% \leq Cr \leq 10\%$$
$$0\% \leq No \leq 1.5\%$$
$$8\% \leq Cr + Mn + Si + Mo + Nb + V + W \leq 12\%,$$

the remainder being iron and impurities resulting from the manufacture.

This alloy offers the advantage of having a corrosion resistance which is improved by the presence of molybdenum.

In all cases the core 4 of the coil 3 may advantageously consist of an alloy either of the Ni48Fe type or of the FeNiCr type, of composition:

$$48.5\% \leq Ni + Co \leq 51.5\%$$
$$0\% \leq Co \leq 7\%$$
$$5\% \leq Cr \leq 8\%$$
$$5\% \leq Cr + Mn + Si + Mo + Nb + V + W \leq 10\%,$$

the remainder being iron and impurities resulting from the manufacture.

This alloy offers the advantage of having at the same time a very high saturation induction (1 tesla) and an acceptable corrosion resistance despite a reduced chromium content.

When the stator is made of an alloy whose composition is such that:

$$48.5\% \leq Ni + Co \leq 51.5\%$$
$$0\% \leq Co \leq 7\%$$
$$8\% \leq Cr \leq 10\%$$
$$0\% \leq No \leq 1.5\%$$
$$8\% \leq Cr + Mn + Si + Mo + Nb + V + W \leq 12\%,$$

the remainder being iron and impurities resulting from the manufacture, the core of the coil may be produced with the same alloy, and this makes it possible to manufacture the stator and the core as a single component and thus to simplify this manufacture.

By way of a first example a cold-rolled strip of 0.5 mm thickness was manufactured from a hot-rolled strip of 4 mm thickness. During the cold rolling the strip was annealed at the intermediate thickness of 1.5 mm. The composition was (in % by weight):

| Ni | Cr | Mo | Mn | Si | Fe |
|----|----|----|----|----|----|
| 55 | 10 | 0  | 0.3 | 0.1 | remainder |

This alloy had the following characteristics, measured on disks cut from the cold-rolled strip and annealed at 1100° C. for 4 hours under pure and dry hydrogen:

saturation induction Bs: 0.77 tesla at −20° C.; 0.75 T at +25° C.; 0.70 T at +70° C.;

Curie temperature Tc: 275° C.;

coercive field Hc: 0.06 oersteds at 25° C.;

electric resistivity $\rho$: 90 $\mu\Omega$ cm at 25° C.

These characteristics are particularly suited to the manufacture of a motor stator of the Lavet type with saturated isthmuses. In addition, because of the high chromium content, this alloy has a corrosion resistance which makes it capable of being employed for the manufacture of watch motors without prior anticorrosion treatment. This corrosion resistance can be demonstrated, for example by subjecting a sample to an alternation of holds for 2 to 4 hours at a temperature of between 60° C. and 70° C. in an atmosphere which has a moisture content higher than 80%, and of holds for 2 to 4 hours at a temperature of between −10° C. and −20° C.; the total duration of the holding periods being between 2 and 4 weeks. With this test it has been ascertained that the alloy of the Ni55Cr10Fe type does not exhibit any visible trace of rust, whereas the alloy of the Ni48Fe type does so.

By way of a second example a cold-rolled strip of 0.45 mm thickness was manufactured from a hot-rolled strip of 4 mm thickness. During the cold rolling the strip was annealed at the intermediate thickness of 1.4 mm. The composition was (in % by weight):

| Ni | Cr | Mo | Mn | Si | Fe |
|----|----|----|----|----|----|
| 50 | 9  | 1  | 0.3 | 0.1 | remainder |

This alloy had the following characteristics, measured on disks cut from the cold-rolled strip and annealed at 1100° C. for 4 hours under pure and dry hydrogen:

saturation induction Bs: 0.76 tesla at −20° C.; 0.75 T at +25° C.; 0.72 T at +70° C.;

Curie temperature Tc: 275° C.;

coercive field Hc: 0.05 oersteds at 25° C.;

electric resistivity $\rho$: 90 $\mu\Omega$ cm at 25° C.

These characteristics are particularly suited to the manufacture of a motor stator of the Lavet type with saturated isthmuses. In addition, comparative tests have shown that this alloy has a resistance to wet corrosion which is slightly improved.

By way of a third example a cold-rolled strip of 0.65 mm thickness was manufactured from a hot-rolled strip of 4 mm thickness. During the cold rolling the strip was annealed at the intermediate thickness of 1.6 mm. The composition was (in % by weight):

| Ni | Cr | Mo | Mn | Si | Fe |
|----|----|----|----|----|----|
| 45 | 9  | 1  | 0.3 | 0.1 | remainder |

This alloy had the following characteristics:

saturation induction Bs: 0.71 tesla at −20° C.; 0.69 T at +25° C.; 0.67 T at +70° C.;

Curie temperature Tc: 260° C.;

coercive field Hc: 0.06 oersteds at 25° C.;

electric resistivity $\rho$: 90 $\mu\Omega$ cm at 25° C.

This alloy has a corrosion resistance identical with that of the preceding example but, because of the slightly lower nickel content, the Curie temperature and the saturation induction are also slightly lower.

We claim:

1. A stepper motor of the type comprising a rotor (1), a stator (2) and a coil (3) consisting of a magnetic core (4) and of a winding (5), wherein the stator (2) consists of a soft magnetic alloy of the FeNiCr type, the chemical composition of which includes, by weight:

$$40\% \leq Ni + Co \leq 60\%$$
$$0\% \leq Co \leq 7\%$$
$$8\% \leq Cr \leq 13.5\%$$
$$8\% \leq Cr + Mn + Si + Mo + Nb + V + W \leq 13.5\%,$$

the remainder being iron and impurities resulting from the manufacture.

2. The motor as claimed in claim 1, wherein the soft magnetic alloy of the FeNiCr type of which the stator (2) consists has the following characteristics:

Curie temperature Tc>200° C.

saturation induction Bs of between 0.69 and 0.8 tesla at +25° C.

coercive field Hc<0.07 oersteds electric resistivity $\rho$>80 $\mu\Omega$ cm.

3. The motor as claimed in claim 1, wherein the chemical composition of the soft magnetic alloy of the FeNiCr type of which the stator consists is such that:

$$53\% \leq Ni + Co \leq 57\%$$
$$0\% \leq Co \leq 7\%$$
$$9\% \leq Cr \leq 11\%$$
$$9\% \leq Cr + Mn + Si + Mo + Nb + V + W \leq 11\%,$$

the remainder being iron and impurities resulting from the manufacture.

4. The motor as claimed in claim 1, wherein the chemical composition of the soft magnetic alloy of the FeNiCr type of which the stator (2) consists is such that:

$$48.5\% \leq Ni + Co \leq 51.5\%$$
$$0\% \leq Co \leq 7\%$$
$$8\% \leq Cr \leq 10\%$$
$$0\% \leq Mo \leq 1.5\%$$
$$8\% \leq Cr + Mn + Si + Mo + Nb + V + W \leq 12\%,$$

the remainder being iron and impurities resulting from the manufacture.

5. The motor as claimed in claim 1, wherein the stator (2) is with magnetically saturable isthmuses.

6. The motor as claimed in claim 1, wherein, in addition, the core (4) is made of FeNiCr alloy, the chemical composition of which includes, by weight:

$$48.5\% \leq Ni + Co \leq 51.5\%$$
$$0\% \leq Co \leq 7\%$$
$$5\% \leq Cr \leq 8\%$$
$$5\% \leq Cr + Mn + Si + Mo + Nb + V + W \leq 10\%,$$

the remainder being iron and impurities resulting from the manufacture.

7. A soft magnetic alloy of the FeNiCr type, the chemical composition of which includes, by weight:

$$53\% \leq Ni + Co \leq 57\%$$
$$0\% \leq Co \leq 7\%$$
$$9\% \leq Cr \leq 11\%$$
$$9\% \leq Cr + Mn + Si + Mo + Nb + V + W \leq 11\%,$$

the remainder being iron and impurities resulting from the manufacture.

8. The alloy as claimed in claim 7, wherein:

$$0.1\% \leq Mn \leq 1\%$$
$$0.05\% \leq Si \leq 0.3\%.$$

9. The alloy as claimed in claim 7, wherein:

$$O < 0.005\%$$
$$S < 0.005\%.$$

10. A soft magnetic alloy of the FeNiCr type, the chemical composition of which includes, by weight:

$$48.5\% \leq Ni + Co \leq 51.5\%$$
$$0\% \leq Co \leq 7\%$$
$$8\% \leq Cr \leq 10\%$$
$$0\% \leq No \leq 1.5\%$$
$$8\% \leq Cr + Mn + Si + Mo + Nb + V + W \leq 12\%,$$

the remainder being iron and impurities resulting from the manufacture.

11. The alloy as claimed in claim 10, wherein:

$$0.1\% \leq Mn \leq 1\%$$
$$0.05\% \leq Si \leq 0.3\%.$$

12. The alloy as claimed in claim 10 or, wherein:

$$O < 0.005\%$$
$$S < 0.005\%.$$

13. The alloy as claimed in claim 11, wherein:

$$O < 0.005\%$$
$$S < 0.005\%.$$

\* \* \* \* \*